United States Patent
DiMarco et al.

(10) Patent No.: US 7,832,796 B2
(45) Date of Patent: Nov. 16, 2010

(54) THREE-PIECE ROOF ASSEMBLY FOR RACE CARS

(75) Inventors: Patrick DiMarco, Ann Arbor, MI (US); Jack Lawson, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 833 days.

(21) Appl. No.: 11/699,226

(22) Filed: Jan. 29, 2007

(65) Prior Publication Data

US 2008/0179912 A1    Jul. 31, 2008

(51) Int. Cl.
*B62D 25/06* (2006.01)
(52) U.S. Cl. .................................................. 296/210
(58) Field of Classification Search .............. 296/185.1, 296/193.04, 102, 210; 29/428
See application file for complete search history.

(56) References Cited

U.S. PATENT DOCUMENTS

| | | | |
|---|---|---|---|
| 4,576,542 A * | 3/1986 | Brasell et al. | 414/626 |
| 4,601,091 A * | 7/1986 | Grimm et al. | 29/423 |
| 6,481,078 B1 * | 11/2002 | Stone | 29/281.5 |
| 6,954,973 B2 * | 10/2005 | Zirbs | 29/407.04 |
| 7,144,076 B2 * | 12/2006 | Wendler et al. | 296/210 |
| 7,290,831 B2 * | 11/2007 | Poss et al. | 296/203.03 |
| 2003/0070272 A1 * | 4/2003 | Zirbs | 29/407.04 |
| 2005/0104418 A1 * | 5/2005 | Zirbs | 296/210 |
| 2006/0237997 A1 * | 10/2006 | Wendler et al. | 296/193.04 |
| 2009/0001771 A1 * | 1/2009 | Lungershausen | 296/210 |
| 2009/0001773 A1 * | 1/2009 | Leopold | 296/217 |

* cited by examiner

*Primary Examiner*—H Gutman
(74) *Attorney, Agent, or Firm*—Frederick Owens, Esq.; Miller Law Group, PLLC

(57) ABSTRACT

A three-piece roof assembly is provided for racing cars in which the two side members are fixedly supported on the frame of the vehicle and the center member is positionable at a selectable canted angle relative to the side members. The center member is formed with laterally extended flanges that overlap the side members to maintain structural integrity between the center member and the respective side members. The canting of the center member creates a gap that varies in width from front to rear. The process for canting a race car roof is significantly simplified and involves fixing the side members to the frame of the vehicle, then positioning the center member at the desired angular orientation, and fixing the center member relative to the side members. The variable width gap between the center member and the side members can be filled with weld material and painted.

14 Claims, 4 Drawing Sheets

THREE-PIECE ROOF ASSEMBLY FOR RACE CARS

FIELD OF THE INVENTION

This invention relates generally to a roof assembly for use on a racing car and, more particularly, to roof assembly configuration that can be positioned in a canted orientation as desired by the owner of the car.

BACKGROUND OF THE INVENTION

Race cars such as are used in the NASCAR NEXTEL Race circuit and in the Busch Racing circuit seek competitive advantages that can be obtained from certain structural modifications on the vehicle itself. One such structural modification is the canting of the roof structure so that the weld lines in the roof assembly are angled with respect to the longitudinal axis of the vehicle in a direction that extends toward the right side of the vehicle as the weld line projects rearwardly. The canted roof structure and angled weld lines present slightly less drag as the race car is proceeding around the race track. The lowered drag presents a competitive advantage.

Generally, the roof structure is canted manually by cutting the roof of the stock vehicle apart and re-welding the roof in the desired orientation. Each owner of a race car can have a different opinion on the exact angle at which the roof lines are to be canted, and thus, the racing cars cannot simply be constructed with canted roof lines. The process of re-configuring the roof into a canted orientation at the angle desired is highly labor intensive. Accordingly, the process is expensive and time consuming, resulting in delays in getting the race car ready for the track.

It would be desirable to provide a roof structure for use in conjunction with a race car that would enable the roof lines to be canted at whatever angle is desired and that would enable the roof structure to be placed into the canted configuration quickly and inexpensively.

SUMMARY OF THE INVENTION

It is an object of this invention to overcome the aforementioned disadvantages of the known prior art by providing a three-piece roof assembly for use on race cars.

It is another object of this invention to provide a three-piece roof assembly that can be configured such that the central member is angularly oriented with respect to the longitudinal centerline of the vehicle.

It is a feature of this invention that the center member of the roof assembly is formed with flange portions that overlap the side members of the roof assembly.

It is an advantage of this invention that the center member of the roof assembly can be oriented angularly with respect to the side members to provide a canted roof assembly for a race car.

It is another feature of this invention that the canting of the center member creates a gap having a variable width from front to rear on the roof assembly between the center member and the respective side members.

It is still another feature of this invention that the variable width gap between the center member and the side members can be filled with weld material to fix the center member to the side members.

It is another advantage of this invention that the weld material in the variable width gap can be ground to the level of the center member and then painted.

It is still another advantage of this invention that the center member can be positioned relative to the side members at whatever cant angle is desired.

It is yet another advantage of this invention that the center member can be selectively positioned as desired without requiring significant amounts of time to disassemble the original roof structure and then reassemble the roof structure in the desired orientation.

It is another advantage of this invention that the canted center member and angled roof lines provide less drag on the race car as the vehicle is proceeding around the race track at high speeds.

It is yet another object of this invention to provide a three-piece roof assembly for a race car for which the center member can be positioned at a canted angle that is durable in construction, inexpensive of manufacture, carefree of maintenance, facile in assemblage, and simple and effective in use.

These and other objects, features and advantages are accomplished according to the instant invention by providing a three-piece roof assembly for use on racing cars in which the two side members are fixedly supported on the frame of the vehicle and the center member is positionable at a selectable canted angle relative to the side members. The center member is formed with laterally extended flanges that overlap the side members to maintain structural integrity between the center member and the respective side members. The canting of the center member creates a gap that varies in width from front to rear. The process for canting a race car roof is significantly simplified and involves fixing the side members to the flame of the vehicle, then positioning the center member at the desired angular orientation, and fixing the center member relative to the side members. The variable width gap between the center member and the side members can be filled with weld material and painted.

BRIEF DESCRIPTION OF THE DRAWINGS

The advantages of this invention will become apparent upon consideration of the following detailed disclosure of the invention, especially when taken in conjunction with the accompanying drawings wherein.

DETAILED DESCRIPTION OF THE PREFERRED EMBODIMENT

Figures 1, 2:
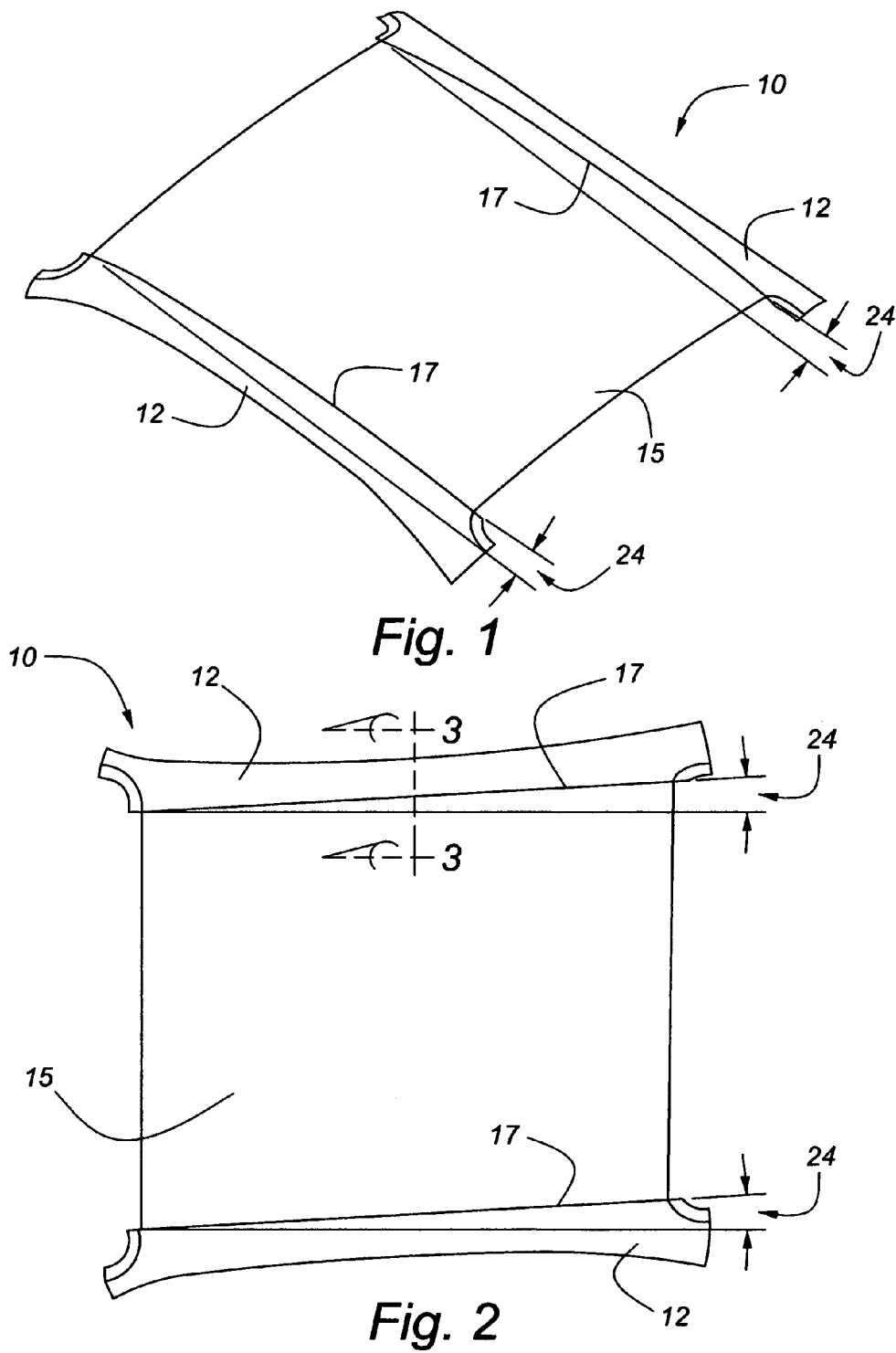
FIG. 1 is a perspective view of a three-piece roof assembly incorporating the principles of the instant invention for use on a racing car.
FIG. 2 is a top plan view of the roof assembly shown in FIG. 1, the roof lines being oriented angularly with respect to the longitudinal centerline of the vehicle.

Referring to FIGS. 1-7, a three-piece roof assembly for a racing car incorporating the principles of the instant invention can best be seen. For racing cars employed on the NASCAR NEXTEL and Busch Racing circuits, most of the race cars are provided with a canted roof assembly having roof lines angled rearwardly and to the right side of the vehicle to produce less drag as the vehicle is raced around the track. The reconfiguration of a standard roof assembly into a canted roof assembly requires the standard roof to be removed from the vehicle 5 and then cut and welded into the desired orientation on the vehicle 5. Different owners desire the cant angle to be different, so placing the roof into the proper orientation and then fixing the roof to the frame of the vehicle becomes a substantial time consuming activity. The principles of the instant invention are intended to facilitate the canting of the race car roof and to enable the owner to select the desired cant angle of the vehicle without significant difficulty.

The instant roof assembly 10 is formed in three pieces, including a pair of laterally spaced side members 12 and a center member 15 positioned between the two side members 12. The side members 12 can be welded to the frame 11 of the vehicle 5 in a conventional manner. The center member 15 is formed with a lateral flange 20 on each lateral side of the center member 15. The flanges 20 overlap the respective side members 12. In the embodiment depicted in FIG. 3, the flanges 20 are positioned underneath the side members 12, while in the embodiment depicted in FIG. 4, the flanges 20 are positioned on top of the side members 12. The embodiment of FIG. 4 will result in a raised portion 22 extending at the cant angle 24 from the front of the roof assembly 10 to the rear thereof. The raised portion 22 may increase drag, which would not be desired, while the embodiment of FIG. 3 is a little more difficult to configure as the center member 15 is not supported on the side members 12.

With the center member 15 able to move relative to the side members 12, the center member 15 can be canted so that the roof line 17 thereof extends at the desired cant angle 24. Furthermore, the center member 15 is free to move relative to the side members 12 at whatever cant angle is desired. Once the desired cant angle 24 has been obtained, the center member 15 is then affixed to the side members 12, preferably by welding.

Figure 3:
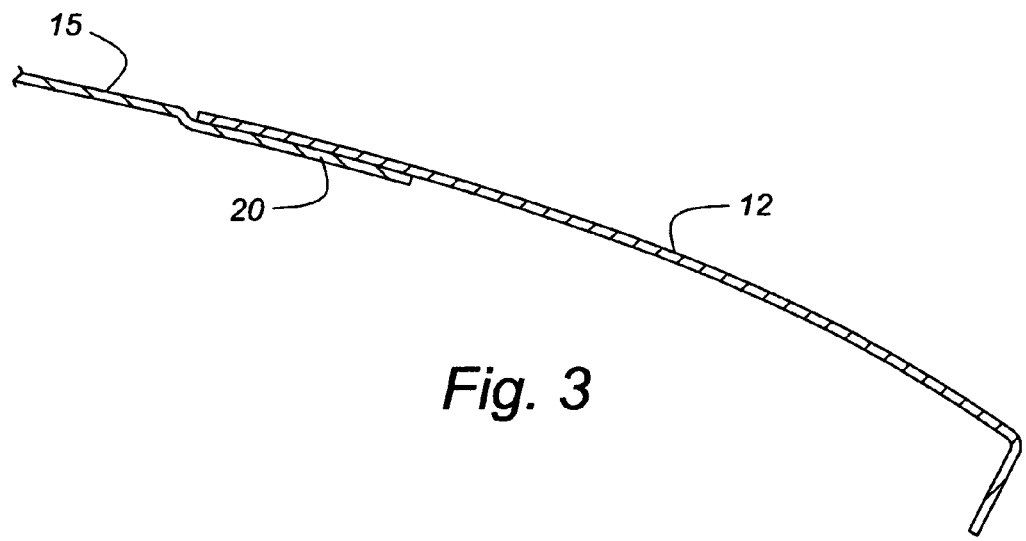
FIG. 3 is a partial cross-sectional view of the roof assembly taken through the overlap joint between the center member and the right side member, corresponding to lines 3-3 of FIG. 2.
Figure 4:
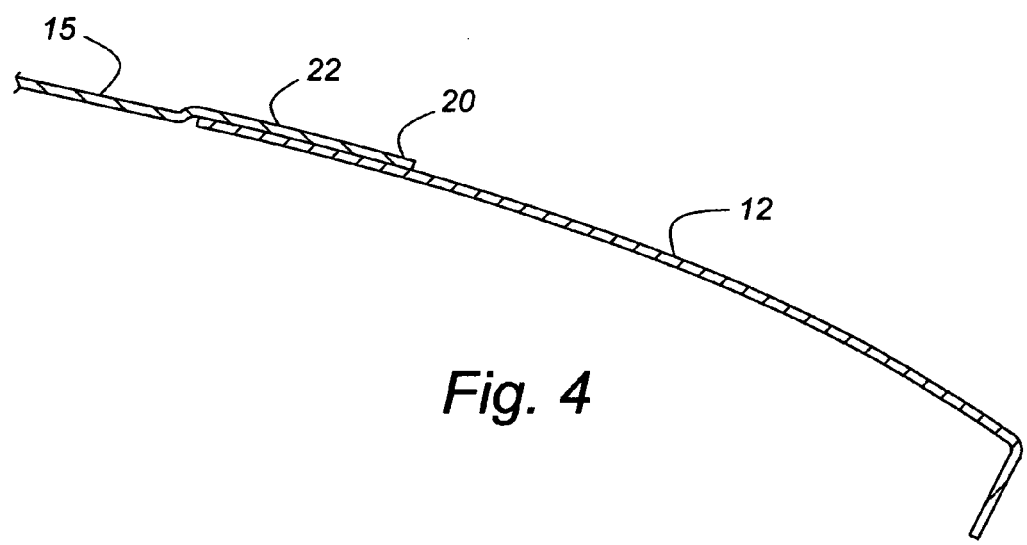
FIG. 4 is a partial cross-sectional view of similar to that of FIG. 3, but depicting an alternative embodiment of the roof assembly.
Figure 5:
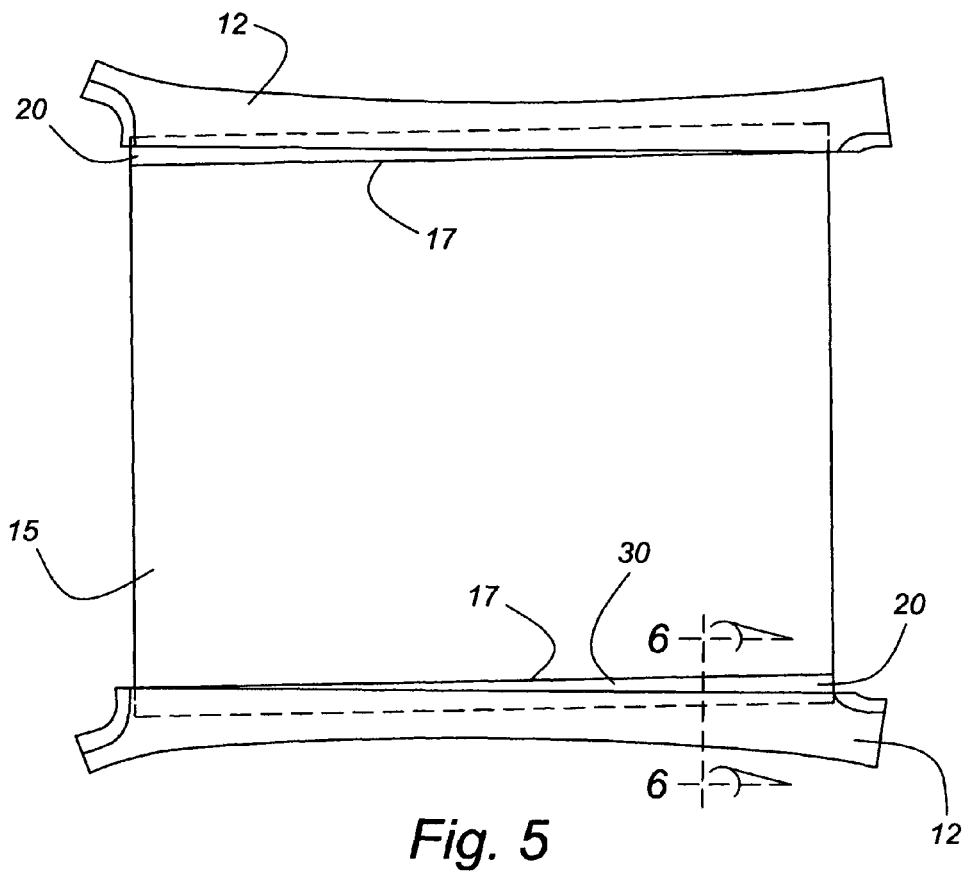
FIG. 5 is a top plan view of the roof assembly showing the formation of a gap between the center member and the side member having a variable width extending from front to back on the roof assembly during the process of forming a canted roof assembly according to the principles of the instant invention.
Figure 6:
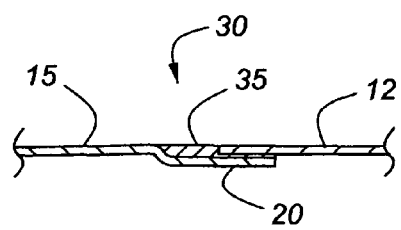
FIG. 6 is a partial cross-sectional view of the roof assembly taken along lines 6-6 of FIG. 5 to show the filling of the gap with weld material.
Figure 7:
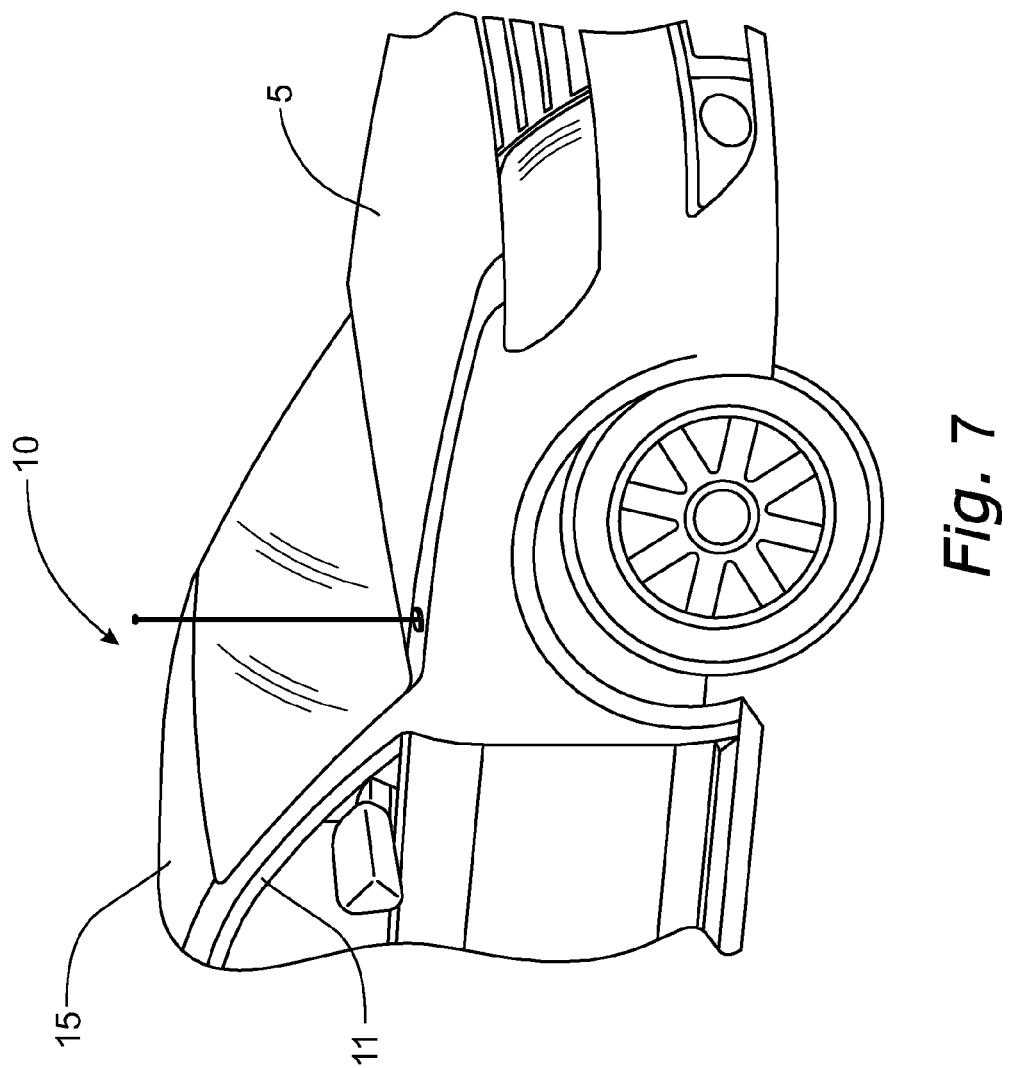
FIG. 7 is a partial side elevational view of a vehicle on which the roof assembly is formed thereon.

As is best seen in FIG. 6, the canting of the center member 15 relative to the side members 12, with the embodiment depicted in FIG. 3, creates a gap 30, 32 between the center member 15 and the respective side members 12. The gap 30 on the left side of the roof assembly 10 increases in width from the front to the rear, while the gap 32 on the right side of the roof assembly 10 decreases in width from the front to the rear. As depicted in the partial cross-sectional view of FIG. 6, the gap 30, 32 would be filled with weld material 35 which would then be ground to the level of the center member 15 and side member 12 so as to present a smooth aerodynamic surface that can be painted with the rest of the roof assembly 10.

With the three-piece roof assembly 10, as described above, the center member 15 can be positioned relative to the side members 12 easily at the cant angle 24 desired and then fixed in place by welding the flanges 20 to the side members 12. Replacement of damaged roofs can also be easily and conveniently accomplished by cutting the side members 12 from the frame of the vehicle and then replacing the new side members 12, followed by a selective canting of the center member 15 to the desired cant angle 24 and secured by welding to the fixed side members 12.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention.

Having thus described the invention, what is claimed is:

1. A roof assembly for an automotive vehicle having a frame, comprising:
   first and second side members secured to said frame at opposing lateral sides of said automotive vehicle; and
   a center member selectively positionable relative to said side members before being secured to said side members to form said roof assembly, said center member is affixed to said side members at a cant angle relative to a longitudinally extending centerline of said roof assembly and defining roof lines that are oriented at said cant angle, the positioning of said center member at said cant angle creates a gap between said center member and each respective said side member, said gap varying in width longitudinally.

2. The roof assembly of claim 1 wherein said center member is formed with laterally opposing flanges that overlap the respective said side members.

3. The roof assembly of claim 2 wherein said center member has a top surface and said opposing flanges are offset below said top surface to underlie said side members.

4. The roof assembly of claim 2 wherein said center member has a top surface and said opposing flanges are offset above said top surface to overlie said side members.

5. The roof assembly of claim 4 wherein said center member is affixed to said side members at a cant angle relative to a longitudinally extending centerline, said opposing flanges forming respective raised portions of said roof assembly corresponding to said side members and being oriented at said cant angle.

6. The roof assembly of claim 1 wherein said gaps are filled with weld material to the level of said top surface of said center member to provide a smooth interface between said center member and each respective said side member.

7. In a roof assembly for a racing car having a frame and opposing lateral sides, the improvement comprising: said roof assembly being formed with first and second spaced apart side members secured to said frame at said opposing lateral sides of said automotive vehicle and a center member selectively positionable relative to said side members before being secured to said side members to form said roof assembly, said center member is affixed to said side members at a cant angle relative to a longitudinally extending centerline of said roof assembly and defining roof lines that are oriented at said cant angle, the positioning of said center member at said cant angle creates a gap between said center member and each respective said side member, said gap varying in width longitudinally.

8. The roof assembly of claim 7 wherein said roof assembly is formed with laterally opposing flanges that overlap the respective said side members and the center member.

9. The roof assembly of claim 8 wherein said center member is formed with said flanges, said center member having a top surface and said opposing flanges being offset above said top surface to overlie each respective said side member.

10. The roof assembly of claim 9 wherein said center member is affixed to said side members at a cant angle relative to a longitudinally extending centerline, said opposing flanges forming raised portions on said roof assembly along said side members, said raised portions being oriented at said cant angle.

11. The roof assembly of claim 8 wherein said center member has a top surface and said opposing flanges are offset below said top surface to underlie said side members.

12. The roof assembly of claim 7 wherein the respective said gaps are filled with weld material to the level of said top surface of said center member to provide a smooth interface between said center member and each respective said side member.

13. The roof assembly of claim 7 wherein said flanges are formed on said center member.

14. A method of forming a roof assembly on a racing car at a cant angle relative to a longitudinally extending centerline of said racing car having a frame and laterally opposing sides, comprising the steps of:

affixing first and second side members to said frame at respective said laterally opposing sides in general alignment with said longitudinally extending centerline;

orienting a center member having lateral side edges at said cant angle which is oriented in a non-parallel orientation with respect to said longitudinally extending centerline; and securing said center member to said side members with said lateral side edges of said center member being positioned at said cant angle;

overlapping opposing flanges between said side members and said center member, said flanges being oriented below a top surface of said center member such that said securing step creates a gap between said center member and each respective said side member;

filling said gaps with weld material; and grinding said weld material to form a smooth interface at the level of said top surface of said center member to create a smooth interface between said center member and each respective said side member.

* * * * *